United States Patent [19]
Gaucher

[11] Patent Number: 4,851,651
[45] Date of Patent: Jul. 25, 1989

[54] AUTOMATIC PROGRAMMER AND DISPENSER OF MICROCIRCUIT CARDS

[75] Inventor: Michel M. Gaucher, Le Mesnil Saint Denis, France

[73] Assignee: Electronique Serge Dassault, Saint Cloud, France

[21] Appl. No.: 30,732

[22] Filed: Mar. 25, 1987

[30] Foreign Application Priority Data

Mar. 25, 1986 [FR] France ............................ 86 04292

[51] Int. Cl.⁴ ............................................ G06F 15/30
[52] U.S. Cl. ...................................... 235/380; 235/475
[58] Field of Search ............... 235/379, 380, 475, 479, 235/492, 487; 221/121, 231, 129, 92, 175, 176; 194/210, 211; 222/2

[56] References Cited

U.S. PATENT DOCUMENTS 4,317,028 2/1982 Simjiam ............................... 235/375
4,467,209 8/1984 Maurer ................................ 235/487
4,600,828 7/1986 Nogami ............................... 235/379
4,641,239 2/1987 Takesako ............................ 235/380

FOREIGN PATENT DOCUMENTS 2551918 5/1977 Fed. Rep. of Germany .
3432557A1 3/1986 Fed. Rep. of Germany .
1540050 9/1968 France .
8215538 11/1984 France .
1277844 6/1972 United Kingdom .

Primary Examiner—A. D. Pellinen
Assistant Examiner—Leon K. Fuller
Attorney, Agent, or Firm—Christie, Parker & Hale

[57] ABSTRACT

A disk (110) carries containers (such as 120) each containing a stack of cards capable of being extracted one-by-one via an orifice (126) when a wheel (151) is moved to an extraction position (151A). A first conveyor (140A) then conveys the extracted card to a programming unit (1) which is capable of being moved to a position enabling a card to be inserted therein without friction, and thereafter lowers a connector (6) onto the card. After the card has been validated and inspected, it is conveyed to a user along the first conveyor (140A) and then along a second conveyor (140B) terminating at a delivery slot (105). An invalid card may be directly rejected into a reject box (180) placed beneath the programming unit (1).

18 Claims, 6 Drawing Sheets

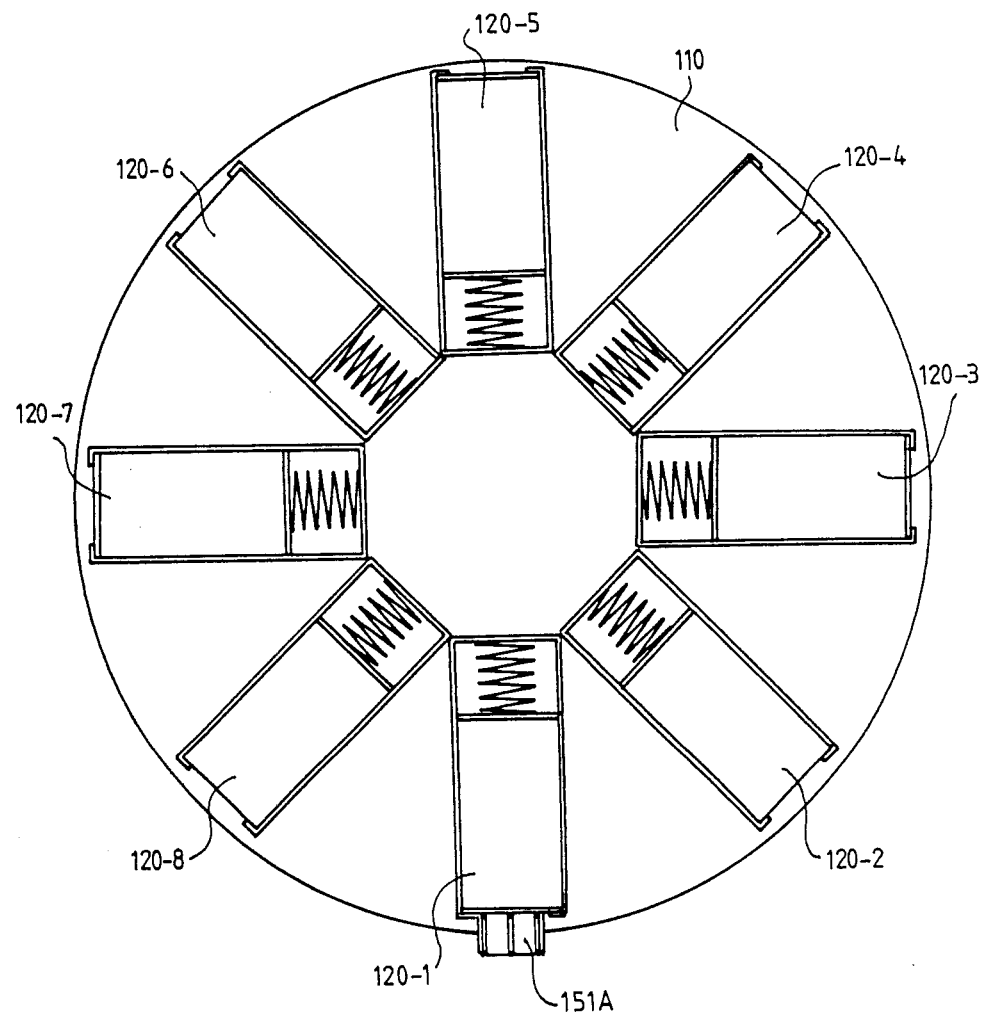

AUTOMATIC PROGRAMMER AND DISPENSER OF MICROCIRCUIT CARDS

The invention relates to dispensing microcircuit cards which are about to come into common use.

BACKGROUND OF THE INVENTION

Microcircuit cards, also known as "smart" cards, are now on sale for use with public pay phones, and such cards may have a value of 40 or 120 telephone charge units, for example. The advantage is clear: since card-accepting public phones do not contain any money they will not be broken into.

Drawbacks lie in amoritizing the cost of setting up such a smart card system and in meeting the on-going cost of dispensing suitable smart cards. These cards can be obtained not only from official telephone services, but also from numerous other retail outlets which must be paid for providing this service.

French patent application No. 86 00511 filed Jan. 15, 1986 in the name of the present applicant, describes an automatic dispenser for smart cards, which dispenser is suitable for dispensing telephone cards. Such machines reduce the cost of dispensing cards. However, they bring back the problem of machines being broken into: since smart card dispensing machines contain money, they will be worth robbing. This danger can be reduced by placing such dispensing machines in crowded locations or in locations which are under constant surveillance. However this solution is not capable of general application.

The present applicant seeks to improve the safety of smart card dispensing machines.

Thus, one aim of the invention is to provide an automatic smart card dispensing machine in which the stock of undispensed cards has no monetary value.

Another aim of the invention is to enable a smart card whose credit has been exhausted to be re-validated (i.e. reprogrammed).

SUMMARY OF THE INVENTION

The present invention provides an automatic dispenser for microcircuit cards, said dispenser comprising:

a cabinet;

dispenser control means also capable of dialog with a user, in order to verify the user's right to a card;

at least one magazine for non-valid microcircuit cards;

pick-up means suitable for extracting one card at a time from said magazine;

a first conveyor for conveying said card to a programming unit capable of validating said card; and a second conveyor suitable for conveying a validated card to a card-dispensing slot through the wall of the cabinet.

In practice, the programming unit is also capable of verifying card validation, and the dispenser includes rejection means enabling any incorrectly validated card to be retained inside the cabinet.

Preferably, the first and second conveyors possess a common portion suitable for transferring the card into the programming unit and out therefrom.

According to another aspect of the invention, the moving programming unit has a second position in which it no longer co-operates with the first conveyor or with the common portion. Invalid cards can then be rejected directly from the conveyor into a receptacle for the purpose.

In a particular embodiment of the invention, the pick-up means comprise a roll or wheel carried on a moving lever and suitable on control for co-operating with the magazine in order to extract a card therefrom and direct it towards the first conveyor.

Advantageously, the first conveyor includes at least two pairs of wheels constituting said common portion with at least one of said wheels being motor-driven. A closed-loop belt can then pass between the wheels of each pair. The second conveyor includes at least two other pairs of wheels specific thereto, with the last such pair being placed close to the outlet slot. The belt also passes through these other pairs of wheels.

It is advantageous for one of the wheels in the intermediate pair of wheels belonging to the second conveyor to act also as a pick-up wheel.

According to yet another aspect of the invention, the card outlet from the magazine, the path along the first conveyor, and the card inlet/outlet of the programming unit are substantially in alignment.

As a result, the path defined by the two pairs of wheels belonging to the second conveyor is, in theory, at an angle relative to the path through the first conveyor. In accordance with the invention, one of the wheels situated level with the transistion is mounted as a moving wheel so as to enable the card to be tilted without losing drive continuity.

In one embodiment, the card magazine includes at least one container storing a stack of cards which are resiliently urged towards a pick-up and outlet position.

A plurality of containers of this type may be mounted on a carrousel.

In a variant embodiment, the magazine comprises a carrousel in the form of a rack suitable for storing one card in each slot of the rack, said carrousel rack being rotatably mounted inside a disk-shaped container which is closed except for a card-delivery slot located level with one of the rack slots. Said container also houses means for rotating the carrousel.

BRIEF DESCRIPTION OF THE DRAWINGS

Embodiments of the invention are described by way of example with reference to the accompanying drawings, in which:

FIG. 3 is a plan view showing a first embodiment of a carrousel constituting a card magazine in accordance with the invention;

The accompanying drawings are, at least in part, definitive in character. They also show geometrical shapes which are difficult to describe fully. Consequently the accompanying drawings may be used not only to clarify the description, but also to contribute to the definition of the invention, where appropriate.

MORE DETAILED DESCRIPTION

Figure 1:
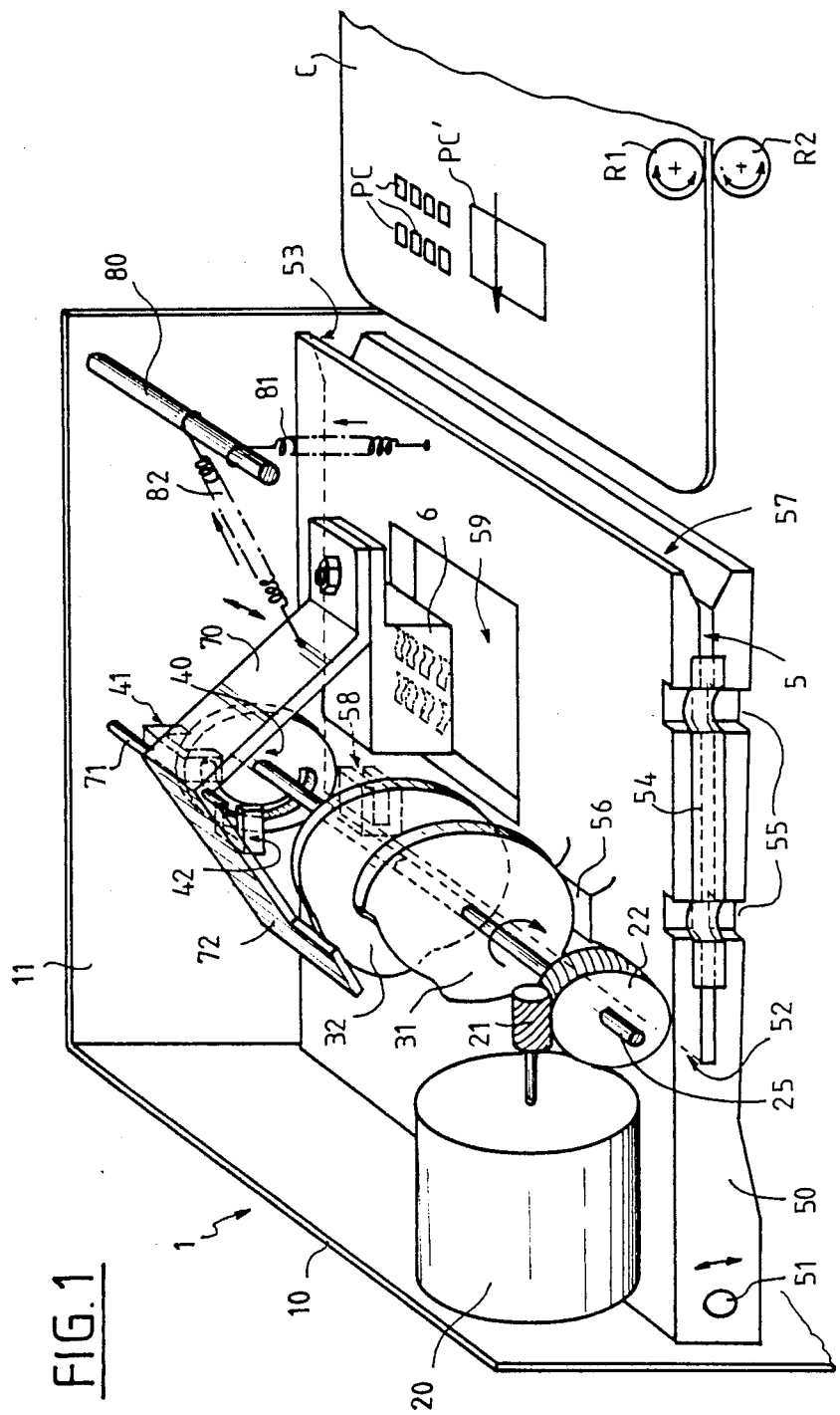
FIG. 1 is a diagrammatic perspective view of a programming unit usable in a device in accordance with the invention.

The description begins with the programming unit, with reference to FIG. 1. This programming unit is the subject of French patent application No. 86 01 794, filed Feb. 18, 1986. The descriptive content of said patent application is incorporated by reference, where necessary, into the present description.

Briefly, the FIG. 1 programming unit comprises a chassis 1 having an end wall 10 and a side wall 11 which are visible in the figure. A DC motor 20 drives an endless screw 21 which cooperates with a gearwheel 22 in order to rotate a shaft 25 clockwise (as seen in FIG. 1) with the shaft 25 carrying two cams 31 and 32 together with a wheel 40 constituting a two-position angular encoder wheel.

A receptacle 5 for receiving microcircuit or "smart" cards is defined by a slot provided in a plate 50 which is pivotally-mounted about a shaft 51.

The cam 31 engages an upwardly-projecting bump 56 on the plate 50. Contact is ensured by a resilient return force provided by a spring 81 mounted between the top of the plate 50 and a rod 80.

The slot for receiving a card such as the card C has a reference edge 53 and an opposite edge including a resilient blade 54 for urging the card C towards the reference edge 53. A detector 58 vertifies that the card is properly positioned in the slot 5.

There is an opening 59 through the top wall of the plate 50 suitable for passing a connector block 6. The connector block is mounted at the end of one of the arms 70 of a bell crank hinged on a shaft 71 and having its other arm disposed to follow the cam 32 by virtue of a resilient force applied on the arm 70 by a spring 82 connected to the rod 80.

Reference is made below to this programming unit 1, or more precisely to a mirror image thereof reflected about a median vertical plane passing therethrough.

Figure 2:
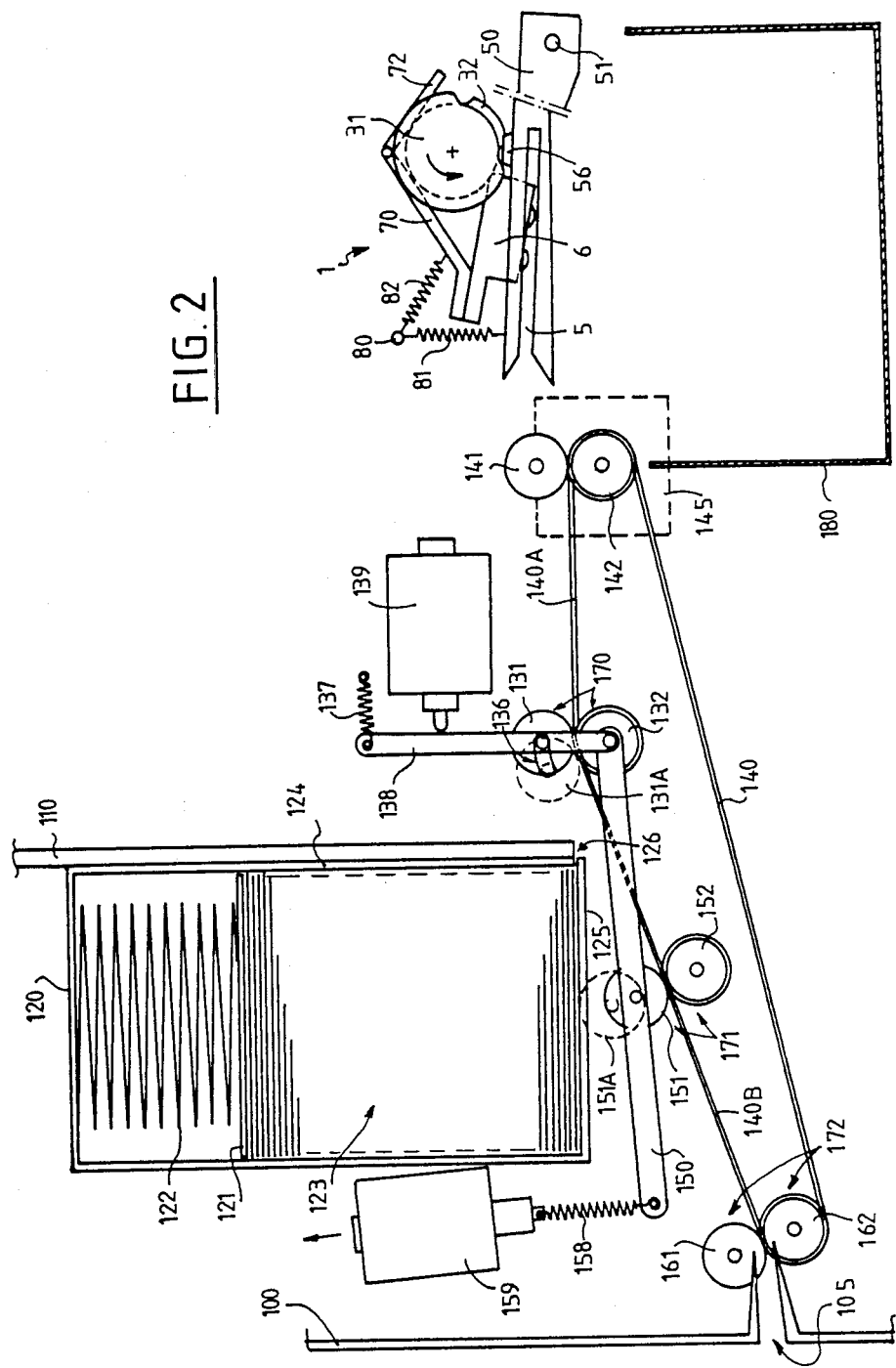
FIG. 2 is a diagrammatic side view of a first embodiment of a device in accordance with the invention.

In FIG. 2, a dispenser in accordance with the inventio comprises a cabinet having a reinforced outer wall of which a portion 100 is visible, and having a slot 105 for dispensing a card to a user.

A vertical disk 110 supports a series of card containers 120. Each container 120 contains internally-mounted resilient means 122 which press against a piston 121 which in turn urges a stack of cards 123 in a downwards direction. The bottom card presses against the bottom wall 125 of the container and is capable of leaving the container via an orifice 126. There is a hole through the bottom wall 125, and a wheel 151 passes through the hole and engages the bottom card when the wheel 151 is raised to a position 151A. The wheel is raised by means of an electromagnet 159 whose rod 158 includes resilient means and is used to displace a lever 150 carrying the wheel 151.

Drive means (not shown) rotate the wheel 151 clockwise (as shown in FIG. 2) when it is in its position 151A (e.g. the belt between 132 and 151).

A card is thus extracted from the container 120, and unstacking techniques are capable of ensuring that only one card is removed at a time, e.g. by using a suitable chute.

The card then leaves along the axis of two pairs of wheels 131 and 132 and 141 and 142. These two pairs of wheels constitute a first conveyor (path 140A), for transporting the card to the programming unit 1, and for removing it from the programming unit.

A second conveyor is formed by the abovementioned two pairs of wheels, together with a third pair of wheels 161 & 162 situated close to the delivery slot 105, and co-operates therewith for card delivery. A fourth, intermediate pair of wheels is defined by the above-mentioned wheel 151 when in its rest position and a wheel 152. A belt 140 runs round a closed loop over the wheels 162, 152, 132, and 142. In other words, this belt passes between the two wheels of each pair. The motor-driven wheel 142 and the belt 140 provide the drive required for both conveyors.

A card edge detector 170, e.g. a photoelectric barrier, is placed immediately to the right of the wheels 131 and 132 (as shown in FIG. 2) i.e. downstream therefrom for cards going towards the programming unit 1. Two other photoelectric barriers 171 and 172 are placed respectively immediately to the left of the pair of wheels 151 and 152 and to the left of the pair of wheels 161 and 162, (i.e. to the downstream sides thereof for a card moving along the second conveyor from the programming unit to the delivery slot 105).

Further, the wheel 131 is specially mounted. It is mounted near the bottom of a rod 158 having resilient means 137 tendin to urge it into a vertical position. The rod 158 may be driven by the armature of an electromagnet 139 in order to tilt it leftwardly (as seen in FIG. 2) so that the wheel 131 follows a path following an arc of a circle 136, along which it is guided by its shaft. This brings the wheel 131 into a position 131A in which the tangent between the wheel in position 131A and the wheel 132 is aligned with the tangents common to pairs of wheels 151 and 152 and 161 and 162.

A box 180 is mounted beneath the programming unit 1 and extends up to its shaft 51. The other way, the box extends practically up to a point vertically below the wheels 141 & 142.

In FIG. 2, the programming unit 1 is shown in its rest position in which it is not co-operating with the pair of wheels 141 and 142 (which wheels correspond to the wheels R1 and R2 shown in FIG. 1).

Figure 2A:
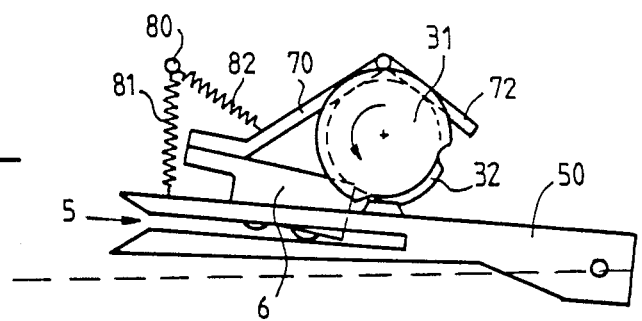
FIGS. 2A to 2C are diagrams showing the operation of the programming unit within the FIG. 2 device.

This rest position is repeated in FIG. 2A. As described in the above-mentioned French patent application No. 86 01794, the programming unit 1 may, on command, begin by taking up a position 2B in which it is capable of receiving a card with substantially no friction, and then a position 2C in which the multiple connector 6 is brought into contact with the contact tabs PC on the microcircuit card.

Figure 2B:
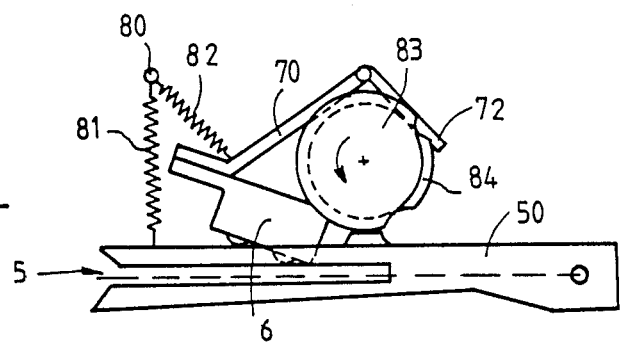

The general operation of the device is thus as follows:

As already mentioned, a card is initally extracted from the container 120. It enters the first conveyor and the unit 1 is placed in the position shown in FIG. 2B in order to receive the card.

Figure 2C:
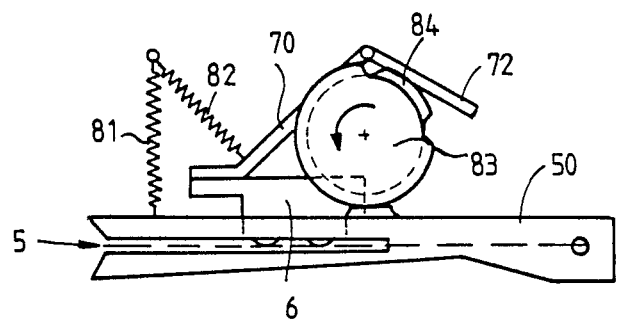

The programming unit 1 then passes to the connection situation shown in FIG. 2C. The card is validated or programmed, and then preferably verified prior to the unit 1 returning to the FIG. 2B position for the card to be removed therefrom. The programming unit then returns to its rest position as shown in FIG. 2A.

If verification shows that the card has been wrongly validated, for any reason whatsoever, the first conveyor is restarted in a generally rightwards direction causing the card to fall directly into the box 180. Where appropriate, the above operations are repeated using a new card taken from the magazine 120.

If the card is properly validated, it advances a little into the first conveyor. In response to an edge of the card (e.g. its leading edge) being detected by the sensors 170, and electromagnet 139 is acutated to tilt the wheel 131 into its position 131A. The card then follows the direction of the second conveyor in portion 140B of the belt. Naturally, the electromagnet 159 is released meanwhile in order to return the wheel carried by the arm 150 to its position 151. It may be noted in passing that the lever 150 is advantageously hinged coaxially with the wheel 132.

The card can then move down along belt portion 140B until it projects out through the slot 105, enabling a user to take it out from the machine. The condition of a card being presented to a user is detected by the photoelectric barrier 171. The photoelectric barrier 172 detects that the card has indeed been taken by the user within a predetermined period of time. The user is preferably reminded by an audible signal (or by other means) if the card is forgotten.

If the card is still not taken, the entire second conveyor (paths 140B and 140A) is actuated in the opposite direction and the card is held in the box 180.

A dispenser in accordance with the invention improves security in several respects: firstly relative to the card magazine itself, and secondly relative to card programming.

A first embodiment of the card magazine is shown in FIG. 3. Eight containers 120-1 to 120-8 (for example) are located on a disk 110. The container 120-1 is engaged with the wheel 151 when in its position 151A.

When the cards are manufacutred they are initially stored in the containers 120. In isolation, a container 120 is closed and cards cannot be extracted therefrom. A locking lever is unlocked solely when the container is placed on a disk such as disk 110 which has a suitable indexing and/or mechanical coding system (3 microswitches or 3 optoelectronic sensors suitably disposed) so that cards can subsequently be extracted one at a time. When containers are not in place on a disk such as the disk 110 within a dispenser in accordance with the invention, cards cannot be extracted therefrom without breaking the container.

Within the dispense, it is impossible to have a more than one card moving at the same time, since the member 151 which extracts the cards moves to its extraction position 151A under the control of a central unit, as described below, only once during each operating cycle of the machine.

Naturally, proper positioning of the container 120-1 opposite the pick-up wheel 151 is ensured by a coding wheel or an equivalent mechanical index system provided on the disk 110. Attention is now directed to card programming.

Depending on the application and the type of card concerned, card validation may consist in fully programming an entirely blank card. At the other extreme, validation may be applied to cards which are almost completely validated except for a single validation bit at a predetermined location. Naturally, numerous intermediate solutions are also possible.

For example, when the application is a telephone card, 40-unit and 120-unit cards may be placed in different ones of the containers 120-1 and 120-2 on the carrousel 110 shown in FIG. 3. These cards may be pre-recorded with inscriptions defining their value in terms of telephone charge units.

Otherwise, if the cards are completely blank, means may be provided within the portion 140B of the second conveyor for visibly marking such cards so as to indicate the number of telephone charge units they are worth. If the possible range of numbers if small, such marking can be performed by rubber stamps controlled by electromagnets. If a wider range of markings is required, a printing technique may be used such as one of those described in the following French patent applications: No. 83 11444 published under the No. 2,548,804, No. 84 10380 published under the No. 2,566,705, or No. 85 01661, which has not yet been published.

A dispenser in accordance with the invention has another important advantage: regardless of the way in which a microcircuit card is programmed or validated, it is possible to provide for a card whose credit has been exhausted to be re-inserted by a user and re-validated or re-programmed by the machine after the user has paid the appropriate sum.

The user presents the card at slot 105 and the card is inserted into the machine so that it reaches its position in the first conveyor 140A (after the wheel 141 has been tilted in the opposite direction).

The user's right to the card is then verified and the card is re-validated or re-programmed. If the re-validation does not work or is impossible (with the number of occasions on which a card can be validated being pre-programmed into the card on manufacture), a new card is programmed and dispensed to the user.

Reference is made above to the user's "right" to the card. In practice this right is obtained by paying a sum of money in coin or bank notes or by any appropriate electronic payment means. However, it is possible that a user may establish his right to a card in some manner other than by payment.

Figure 4:
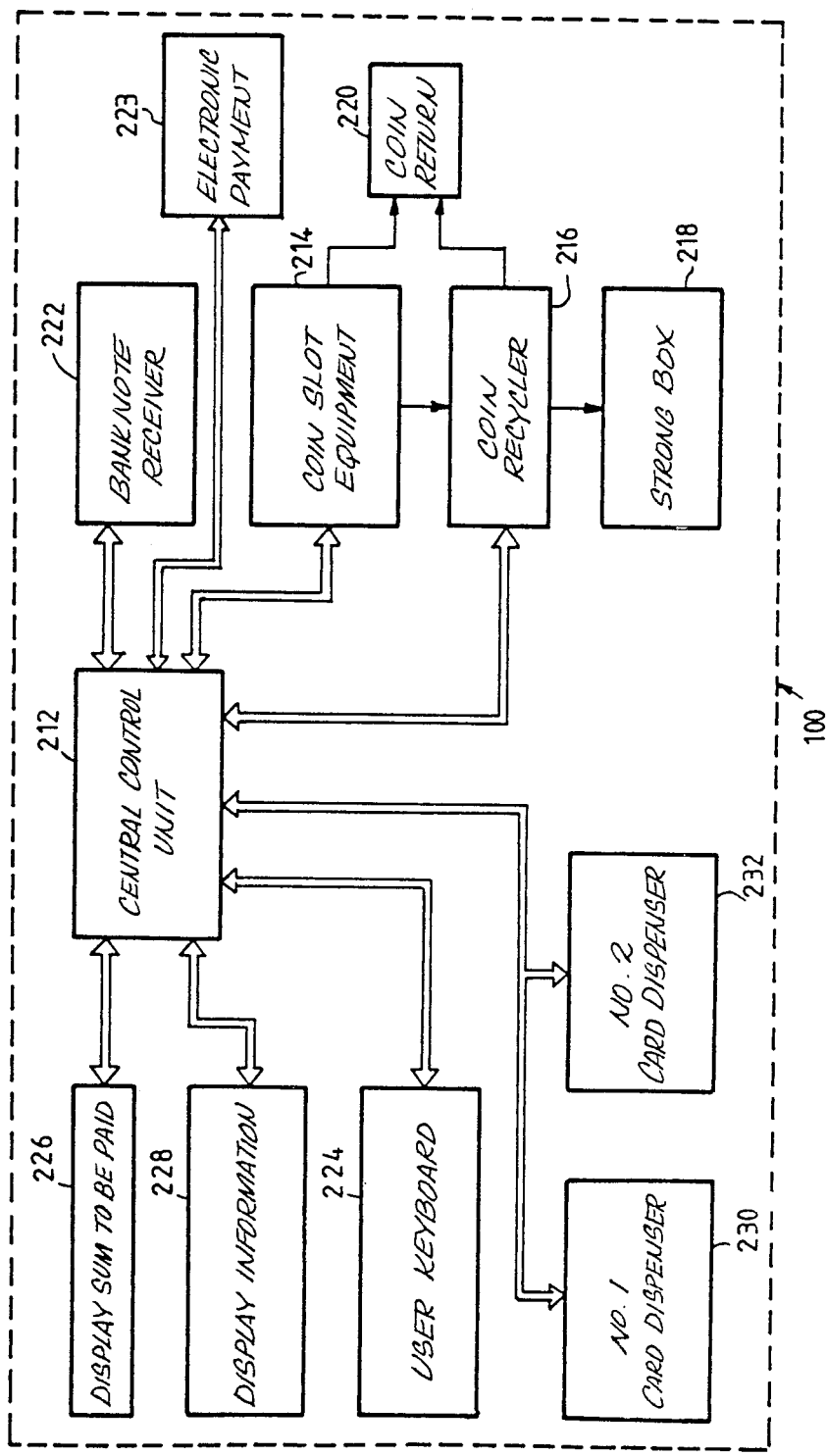
FIG. 4 is a block diagram showing the general structure of a device in accordance with the invention from the electronic and operational points of view.

At present it will be assumed that the right to a card is obtained by payment. The general operational structure of the apparatus is shown in FIG. 4, which is similar to FIG. 1 of above-mentioned patent application No. 86 00 511. Reference can be made to this prior patent application for further details, with the reference numerals in present FIG. 4 corresponding to the reference numerals of FIG. 1 in the earlier patent application prefixed by the digit 2. Members 214 to 218 plus a return chute 222 are used for transactions in coin. Payment by means of bank notes is provided by means of a receptacle 222.

Preferably, payment may be made by conventional electronic payment means as illustrated at 223 ("smart" bank card, credit card, etc.).

This takes place under the control of a central control unit 212 which receives instructions from a user keyboard 224, and which actuates display means 226 and 228 as a result, for example to show the amount of money that remains to be paid and various other items of information.

After verifying the user's right to a card, the central unit 212 controls a dispense such as 230 or 232. given that a card magazine in accordance with the invention may contain a very large number of cards, it is presently believed that a single dispenser will suffice in practice.

Figure 5:
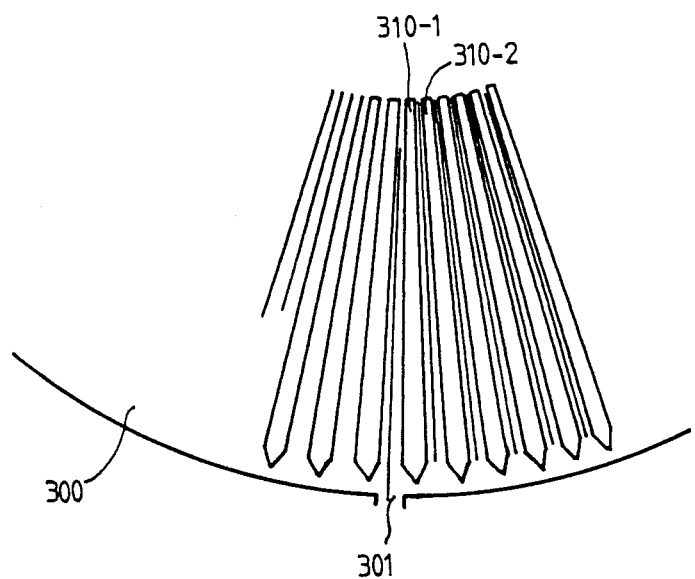
FIGS. 5 and 5A are diagrams showing a variant embodiment of a magazine in accordance with the invention.

The connections between the central unit 212 and the dispenser consist in:

controlling the position of the carrousel 110 (FIG. 2) or 300 (FIG. 5, described below);

actuating the electromagnet 159 and the stepper motor 145 for extracting a card unless the user has presented a card in the slot 105 for re-validation; and simultaneously or sequentially positioning the programming unit 1, reversing the conveyors and actuating the electromagnet 139 until the new card has been dispesnsed to the user, and taking appropriate account of the variations described above concerning incorrectly validated cards or cards for re-validation.

The programming unit itself has its motor 20 connected to the central unit 212 as well as its detectors 41, 42, and 58, and of course the set of tabs in the connector block 6.

A variant magazine in accordance with the invention is now described with reference to FIGS. 5 and 5A.

Figure 5A:
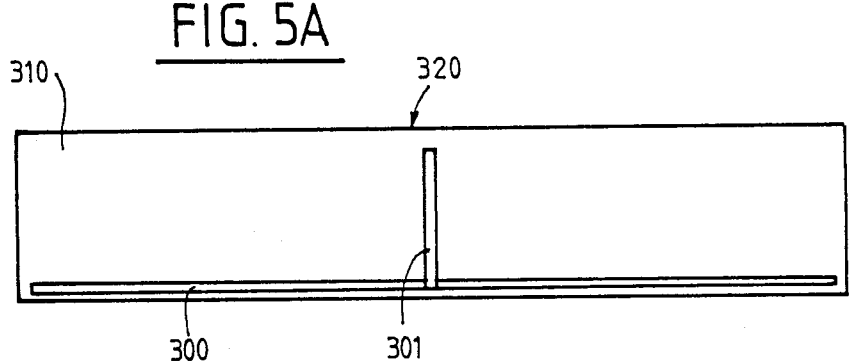

FIG. 5A is a side view of the magazine itself constituted by a rigid disk-shaped container which is preferably closed by means of lead-sealed screws. Inside the container there is a flat disk 300 and drive means 320 coaxial therewith. The drive means 320 have associated control electronics inside the container 310 so as to make it impossible to rotate the disk 300 without knowing the details of the control means, and for example safety codes associated with control thereof.

FIG. 5 is a plan view of the disk 300 with the container 310 removed.

It can be seen that this disk carries a rack structure having a plurality of slots each of which houses a single card in a radial position such as 310-1, 310-2, etc.

A card can be delivered only if its slot in the rack is level with the outlet slot 301 through the wall of the container, thereby allowing the card to drop through the slot.

The security obtained in this way is practically as good as that obtained in the first embodiment since the disk 300 cannot be rotated inside the container 310 without a thorough knowledge of the system and its drive security codes, or else without breaking the container 310.

A card can then be taken up by a suitable mechanism for applying it to the path 140A of the first conveyor. Alternatively it may drop to a predetermined position in a slideway or chute which brings it into position between the wheels 131 and 132. All of the wheels in the device can then be aligned.

It is important to ensure that theft of the card programming means will not enable cards to be fraudulently programmed. In order to make this possible, the equipment is advantageously permanently monitored over a telephone link. It then receives a coding key (e.g. a DES =Date Encryption Standard key as already used for inter-bank transactions, for example), with the key being required before cards can be validly programmed. Further, backed-up read/write memories may be automatically erased in the event of the device being broken into or stolen.

Further, the device in accordance with the invention may additionally include means for reading/writing the magnetic tracks of a card, with said means being located, for example, between the wheels 131 and 141.

Naturally, the present invention is not limited to the embodiments described, but extends to any variant lying within the scope of the following claims.

I claim:

1. An automatic dispenser for microcircuit cards, said dispenser comprising:
   a cabinet;
   dispenser control means capable of dialog with a user, in order to verify the user's right to a card;
   at least one magazine in the cabinet containing non-valid microcircuit cards;
   pick-up means in the cabinet for extracting one card at a time from said magazine;
   a programming unit in the cabinet having means for validating a non-valid microcircuit card and for re-validating a previously programmed microcircuit card;
   first conveyor means for conveying the extracted non-valid card to said programming unit for validating said card;
   second conveyor means for conveying an externally input and previously programmed card to said programming unit for re-validating said previously programmed card; and
   third conveyor means for conveying the validated card or re-validated card from the programming unit to a card-dispensing slot through the wall of the cabinet.

2. A dispenser according to claim 1, wherein the programming unit is also capable of verifying card validation, and wherein it includes means for rejecting any incorrectly-validated card and for storing it inside the cabinet.

3. A dispenser according to claim 1, wherein said first and third conveyor means includes a common conveyor portion suitable for transferring the card to the programming unit and away therefrom.

4. A dispenser according to claim 3, wherein the programming unit is movable and includes a second position in which it is no longer accessible to or from said common conveyor portion, thereby enabling invalid card rejection to take place directly from the common conveyor portion into an invalid card receptacle.

5. A dispenser according to claim 3, wherein said pick-up means comprise a wheel mounted on a moving lever and suitable for cooperating on command with the magazine to extract the card therefrom and apply it to the first conveyor means.

6. A dispenser according to claim 3, wherein the first conveyor means includes at least two pairs of wheels constituting said common portion, with at least one of said wheels being motor-driven.

7. A dispenser according to claim 3, wherein the third conveyor means includes a belt passing in a closed loop between a first pair of wheels of the first conveyor means and between wheels and a last pair of wheels placed closed to the card-dispensing slot.

8. A dispenser according to claim 7, wherein the intermediate pair of wheels of the third conveyor means also constitutes said pick-up means.

9. A dispenser according to claim 3, wherein a card outlet from the magazine, the path along the first conveyor means, and a card inlet/outlet of the programming unit are substantially in alignment.

10. A dispenser according to claim 9, wherein the path defined by the first pair and the last pair of wheels belonging to the third conveyor means is at a slope relative to the path through the first conveyor means, and wherein one of the first pair of wheels situated level with the transition between the conveyors is a moving wheel to enable a card to tilt without losing drive continuity.

11. A dispenser according to claim 10, wherein the center of said moving wheel follows an arc of a circle which is substantially concentric with the other wheel of the same pair.

12. A dispenser according to claim 10, including a card edge detector adjacent to said moving wheel, on the first conveyor side thereof.

13. A dispenser according to claim 3, including a card edge detector situated close to the middle of the portion specific to the third conveyor means, and a card edge detector close to the card dispensing slot.

14. A dispenser according to claim 1, wherein the card magazine includes at least one container housing a stack of cards which is resiliently-urged towards a pick-up position to enable said cards to be extracted therefrom.

15. A dispenser according to claim 14, wherein a plurality of such containers are mounted on a carrousel.

16. A dispenser according to claim 1, wherein the magazine comprises a carrousel having a card rack suitable for housing one card per rack slot, said carrousel being rotatably-mounted inside a disk-shaped container which is closed except for an outlet slot level with one of the card slots in the rack, said container also housing carrousel drive means.

17. A method for programming and dispensing microcircuit cards, comprising:
disposing inside a cabinet (a) at least one magazine containing non-valid microcircuit cards, (b) pick-up means for extracting one card at a time from said magazine, and (c) a programming unit for validating a non-valid microcircuit card and for re-validating a previously programming microcircuit card;
providing a dispenser control means capable of dialog with a user in order to verify the user's right to a card;
conveying a non-valid card extracted from the magazine to said programming unit for validating said non-valid card;
conveying an externally input and previously programmed card to said programming unit for re-validating said previously programmed card; and
conveying the validated card or the re-validated card to a card dispensing slot through the wall of the cabinet.

18. The method according to claim 17, including moving the programming unit to a position which is no longer accessible to or from conveyors from said validated or re-validated microcircuit cards for enabling invalid card rejection to take place directly from such conveyor into an invalid card receptacle contained within the cabinet.

* * * * *

UNITED STATES PATENT AND TRADEMARK OFFICE
CERTIFICATE OF CORRECTION

PATENT NO. : 4,851,651

DATED : July 25, 1989

INVENTOR(S) : Michel M. Gaucher

It is certified that error appears in the above-identified patent and that said Letters Patent is hereby corrected as shown below:

In the Specification:

Column 2, line 41, change "carrousel" to -- carousel --.
Column 2, line 55, change "carrousel" to -- carousel --.

Column 3, line 41, change "inventio" to -- invention --.

Column 4, line 1, change "abovementioned" to
              -- above-mentioned --.
Column 4, line 7, change "round" to -- around --.
Column 4, line 24, change "tendin" to -- tending --.

Column 5, line 1, change "and" to -- the --.
Column 5, lines 4,5, delete "meanwhile".
Column 5, line 41, change "dispense" to -- dispenser --.
Column 5, lines 61,62, change "carrousel" to -- carousel --.

Column 6, line 1, change "if" to -- is --.
Column 6, line 54, change "dispense" to -- dispenser --.
Column 6, line 54, change "given" to -- Given --.
Column 6, line 60, change "carrousel" to -- carousel --.

Column 7, line 44, change "Date" to -- Data --.

UNITED STATES PATENT AND TRADEMARK OFFICE
CERTIFICATE OF CORRECTION

PATENT NO. :  4,851,651

DATED      :  July 25, 1989

INVENTOR(S):  Michel M. Gaucher

It is certified that error appears in the above-identified patent and that said Letters Patent is hereby corrected as shown below:

In the Claims

Column 9, lines 9,11,12,16, change "carrousel" to -- carousel -- (all occurrences).

Signed and Sealed this

Twenty-seventh Day of November, 1990

Attest:

HARRY F. MANBECK, JR.

*Attesting Officer*    *Commissioner of Patents and Trademarks*